(12) United States Patent
Lin et al.

(10) Patent No.: US 11,688,102 B2
(45) Date of Patent: Jun. 27, 2023

(54) IMAGE CAPTURE SYSTEM WITH CALIBRATION FUNCTION

(71) Applicant: eYs3D Microelectronics, Co., Taipei (TW)

(72) Inventors: Ming-Hua Lin, Taipei (TW); Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 16/551,736

(22) Filed: Aug. 27, 2019

(65) Prior Publication Data

US 2020/0074684 A1 Mar. 5, 2020

Related U.S. Application Data

(60) Provisional application No. 62/723,493, filed on Aug. 28, 2018.

(51) Int. Cl.
*G06T 7/80* (2017.01)
*H04N 13/204* (2018.01)
*G06T 7/521* (2017.01)

(52) U.S. Cl.
CPC .............. *G06T 7/85* (2017.01); *G06T 7/521* (2017.01); *H04N 13/204* (2018.05); *G06T 2207/10028* (2013.01)

(58) Field of Classification Search
CPC . G06T 7/85; G06T 7/521; G06T 2207/10028; G06T 2207/10012; G06T 2207/30252; H04N 13/204; H04N 13/246; H04N 13/254; H04N 13/271; H04N 2013/0081
See application file for complete search history.

(56) References Cited

U.S. PATENT DOCUMENTS

| | | | |
|---|---|---|---|
| 2009/0052740 A1* | 2/2009 | Sonoura | G06K 9/32 382/103 |
| 2014/0348416 A1* | 11/2014 | Lee | G06T 7/593 382/154 |
| 2015/0002638 A1* | 1/2015 | Suzuki | G01B 11/026 348/47 |
| 2019/0295273 A1* | 9/2019 | Price | H04N 13/366 |
| 2020/0013185 A1* | 1/2020 | Yoshimura | G06T 7/521 |
| 2020/0236338 A1* | 7/2020 | Mitani | B60R 1/00 |

FOREIGN PATENT DOCUMENTS

| | | | |
|---|---|---|---|
| CN | 105164549 A | | 12/2015 |
| CN | 107564051 A | * | 1/2018 |
| CN | 108345002 A | | 7/2018 |
| TW | 201631963 A | | 9/2016 |
| TW | 201717613 A | | 5/2017 |

* cited by examiner

*Primary Examiner* — Maria E Vazquez Colon
(74) *Attorney, Agent, or Firm* — Winston Hsu (57) ABSTRACT

An image capture system with calibration function includes an image capture device, a laser rangefinder, and a processer. The image capture device captures two images. The processer determines at least one feature point according to the two images, and generates depth information corresponding to each feature point of the at least one feature point according to the two images, wherein the laser rangefinder measures a reference distance corresponding to the each feature point, and the processer optionally calibrates the depth information or the two images according to the reference distance.

10 Claims, 6 Drawing Sheets

IMAGE CAPTURE SYSTEM WITH CALIBRATION FUNCTION

CROSS REFERENCE TO RELATED APPLICATIONS

This application claims the benefit of U.S. Provisional Application No. 62/723,493, filed on Aug. 28, 2018 and entitled "On-Site Targetless Calibration Method and Stereo Camera System Thereof", the contents of which are incorporated herein by reference.

BACKGROUND OF THE INVENTION

1. Field of the Invention

The present invention relates to an image capture system, and particularly to an image capture system with calibration function.

2. Description of the Prior Art

In the prior art, a stereo image capture device is usually installed on a drone or an automobile to measure a distance between the drone or the automobile and surrounding objects. However, a mechanism accuracy required by the stereo image capture device may not be maintained due to a usage environment or a usage way of the stereo image capture device (e.g. the usage environment or the usage way of the stereo image capture device can change positions or capture image angles of a left-eye image capturer and a right-eye image capturer of the stereo camera), resulting in the stereo image capture device needing to be calibrated. However, calibration methods provided by the prior art mainly utilize certain calibration patterns (such as a checkerboard test pattern) to execute calibration, wherein the calibration methods provided by the prior art need to be executed in a manufactory of the stereo image capture device with professional calibration equipment. Therefore, to calibrate the stereo image capture device, the drone or the automobile needs to return to the manufactory of the stereo image capture device. That is, the calibration methods provided by the prior art are obviously not convenient choices. Therefore, how to calibrate the stereo image capture device more rapidly and conveniently is an important issue for a designer of the stereo image capture device.

SUMMARY OF THE INVENTION

An embodiment of the present invention provides an image capture system with calibration function. The image capture system includes an image capture device, a laser rangefinder, and a processor. The image capture device captures two images. The processor is coupled to the image capture device and the laser rangefinder for determining at least one feature point according to the two images and generating depth information corresponding to each feature point of the at least one feature point according to the two images, wherein the laser rangefinder measures a reference distance corresponding to the each feature point, and the processor optionally calibrates the depth information or the two images according to the reference distance.

Another embodiment of the present invention provides an image capture system with calibration function. The image capture system includes an image capture device, a laser rangefinder, and a processor. The image capture device includes an image capturer and a light source, wherein the light source emits emission light, and the image capturer captures an image including the emission light. The processor is coupled to the image capture device and the laser rangefinder for determining at least one feature point according to the image and generating depth information corresponding to each feature point of the at least one feature point according to the image, wherein the laser rangefinder measures a reference distance corresponding to the each feature point, and the processor optionally calibrates the depth information or the two images according to the reference distance.

Another embodiment of the present invention provides an image capture system with calibration function. The image capture system includes an image capture device, a laser rangefinder, and a processor. The processor generates a plurality of depth information according to at least one image captured by the image capture device, wherein the laser rangefinder measures a plurality of reference distances corresponding to the plurality of depth information, and the processor calibrates the plurality of depth information according to the plurality of reference distances.

The present invention provides an image capture system with calibration function. The image capture system utilizes an image capture device to capture at least one image, generates a plurality of depth information according to the at least one image, and utilizes a laser rangefinder to measure a plurality of reference distances corresponding to the plurality of depth information. Because the image capture system utilizes the laser rangefinder to generate the plurality of reference distances, the image capture system can calibrate the plurality of depth information according to the plurality of reference distances. Therefore, compared to the prior art, the present invention can execute a calibration more rapidly and conveniently.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
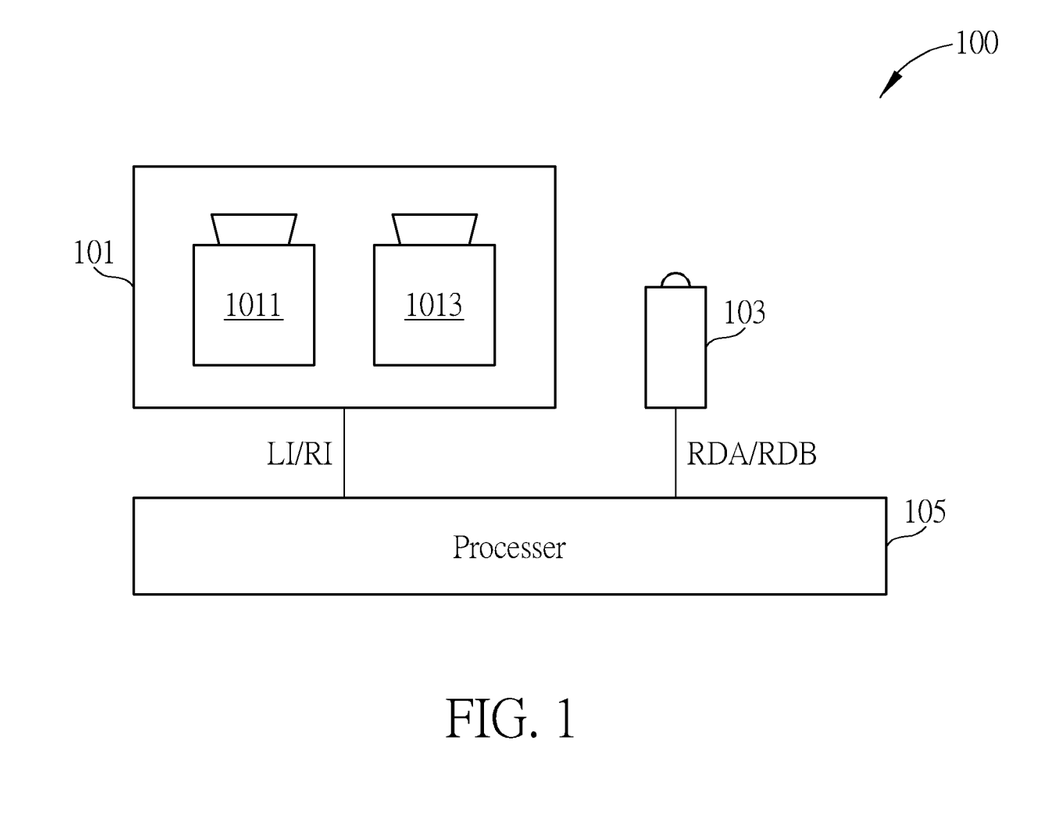
FIG. 1 is a diagram illustrating an image capture system with calibration function according to a first embodiment of the present invention.

Please refer to FIG. 1. FIG. 1 is a diagram illustrating an image capture system 100 with calibration function according to a first embodiment of the present invention. As shown in FIG. 1, the image capture system 100 includes an image capture device 101, a laser rangefinder 103, and a processor 105, wherein the image capture device 101 and the laser rangefinder 103 are coupled to the processor 105. The image capture device 101 includes two image capturers 1011, 1013, wherein the two image capturers 1011, 1013 are used for capturing two images, for example, a left-eye image LI and a right-eye image RI. But, the present invention is not limited to the image capture device 101 including the two image capturers 1011, 1013. That is, the image capture device 101 can include at least two image capturers.

Figure 2:
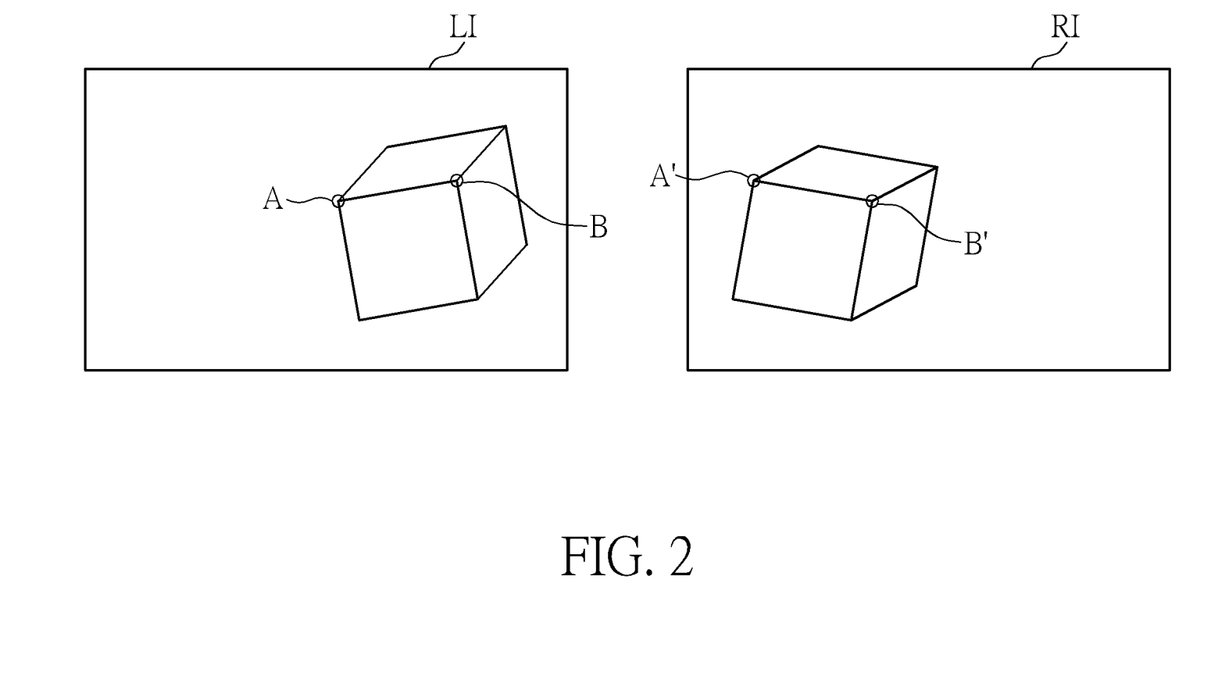
FIG. 2 is a diagram illustrating the left-eye image and the right-eye image.

Please refer to FIG. 2. FIG. 2 is a diagram illustrating the left-eye image LI and the right-eye image RI. The processer 105 can determine feature points A, B of the left-eye image LI and feature points A', B' of the right-eye image RI according to the left-eye image LI and the right-eye image RI, wherein the feature points A', B' correspond to the feature points A, B. But, the present invention is not limited to the processer 105 only determining the feature points A, B. That is, the processer 105 can determine at least one feature point according to the left-eye image LI and the right-eye image RI. In addition, the processer 105 generates depth information DA according to the feature points A, A', wherein the depth information DA corresponds to the feature points A, and the depth information DA can be represented by a disparity, a distance, or other kind of representations. For example, in one embodiment of the present invention, because a first disparity exists between the feature point A and the feature point A', the processer 105 can generate a distance corresponding to the feature point A as the depth information DA according to the first disparity and a triangulation method. In addition, in another embodiment of the present invention, the processer 105 can take the first disparity as the depth information DA. In addition, the processer 105 also can generate depth information DB according to the feature points B, B', wherein the depth information DB corresponds to the feature points B. In addition, the laser rangefinder 103 can be a multi-point laser range finder or a plurality of single-point laser range finders, wherein the processer 105 can adjust a direction or an angle of the laser rangefinder 103 to make the laser rangefinder 103 emit laser beams to the feature points A, B. Therefore, the laser rangefinder 103 can measure a reference distance RDA according to the feature point A and the triangulation method, and measure a reference distance RDB corresponding to the feature point B according to the feature point B and the triangulation method, wherein the reference distances RDA, RDB correspond to the feature points A, B, respectively. But, in another embodiment of the present invention, the laser rangefinder 103 measures the reference distance RDA according to the feature point A and a time-of-flight method, and measures the reference distance RDB according to the feature point B and the time-of-flight method. In addition, in another embodiment of the present invention, the laser rangefinder 103 emits the laser beams first. Then, the processer 105 determines corresponding feature points according to positions of the laser beams in the left-eye image LI and the right-eye image RI. In addition, in another embodiment of the present invention, the laser rangefinder 103 is a single-point laser range finder. Meanwhile, the laser rangefinder 103 can emit a laser beam to the feature point A and measure the reference distance RDA according to the above-mentioned operation methods of the laser rangefinder 103 and the processer 105. Then, the laser rangefinder 103 can emit the laser beam to the feature point B and measure the reference distance RDB according to the above-mentioned operation methods of the laser rangefinder 103 and the processer 105. In addition, in another embodiment of the present invention, the laser rangefinder 103 is the single-point laser range finder, wherein the laser rangefinder 103 first emits a first laser beam with a first direction or a first angle. Then, the processer 105 determines a first feature point according to a position of the first laser beam in the left-eye image LI and the right-eye image RI, such that the laser rangefinder 103 can measure a reference distance corresponding to the first feature point. After that, the laser rangefinder 103 again emits a second laser beam with a second direction or a second angle. Then, the processer 105 determines a second feature point according to a position of the second laser beam in the left-eye image LI and the right-eye image RI, such that the laser rangefinder 103 can measure a reference distance corresponding to the second feature point. In addition, in another embodiment of the present invention, the laser rangefinder 103 can be the multi-point laser range finder, the plurality of single-point laser range finders, or the single-point laser range finder, wherein the direction or the angle of the laser rangefinder 103 cannot be adjusted. Meanwhile, when the laser rangefinder 103 emits the laser beams, the processer 105 and the laser rangefinder 103 generates the feature points A, B and the reference distances RDA, RDB according to a position difference of the image capture system 100 between a first time and a second time or a position difference of objects of a scene corresponding to the image capture system 100 between a first time and a second time.

After the laser rangefinder 103 measures and obtains the reference distances RDA, RDB, the processer 105 receives the reference distances RDA, RDB from the laser rangefinder 103. In one embodiment of the present invention, because the depth information DA, DB are represented by distances, the processer 105 can generate a first difference between the depth information DA and the reference distance RDA. Similarly, the processer 105 can generate a second difference between the depth information DB and the reference distance RDB. When the at least one difference of the first difference and the second difference is greater than a first predetermined value, the processer 105 determines that the depth information DA, DB need to be calibrated. In addition, in another embodiment of the present invention, because the processer 105 generates the depth information DA, DB according to the left-eye image LI and the right-eye image RI, when the at least one difference of the first difference and the second difference is greater than the first predetermined value, the processer 105 determines that the left-eye image LI and the right-eye image RI need to be calibrated.

In addition, in another embodiment of the present invention, the processer 105 determines whether image misalignment exists between the left-eye image LI and the right-eye image RI. For example, the processer 105 can check whether scan lines of the left-eye image LI and scan lines of the right-eye image RI are parallel to a baseline between the image capturers 1011, 1013, or check whether the scan lines of the left-eye image LI and the scan lines of the right-eye image RI are parallel each other. When the image misalignment exists between the left-eye image LI and the right-eye image RI, the processer 105 determines that the depth information DA, DB, or the left-eye image LI and the right-eye image RI need to be calibrated.

In addition, in another embodiment of the present invention, the processer 105 can generate a depth map according to the left-eye image LI and the right-eye image RI first. Then, the processer 105 determines whether a number of valid pixels of the depth map is less than a second predetermined value. When the number of the valid pixels of the depth map is less than the second predetermined value, the processer 105 determines that the depth information DA, DB, or the left-eye image LI and the right-eye image RI need to be calibrated. But, the present invention is not limited to the processor 105 determining that the depth information DA, DB need to be calibrated according to the number of the valid pixels of the depth map. That is, the processor 105 can determine that the depth information DA, DB, or the left-eye image LI and the right-eye image RI need to be calibrated according to other characteristics of the depth map.

When the processor 105 determines that the depth information DA, DB, or the left-eye image LI and the right-eye image RI need to be calibrated, the processor 105 calibrates the depth information DA, DB, or the left-eye image LI and the right-eye image RI according to the reference distances RDA, RDB. For example, in one embodiment of the present invention, the processor 105 can calculate a first relation F1 according to the depth information DA, DB, the reference distances RDA, RDB, equation (1) and a regression analysis method:

$$RDX = F1(DX) \tag{1}$$

As shown in equation (1), the reference distances RDA, RDB are substituted into RDX, and the depth information DA, DB are substituted into DX to calculate the first relation F1, wherein the first relation F1 can be linear or non-linear. But, the present invention is not limited to the processor 105 calculating the first relation F1 according to the regression analysis method. In another embodiment of the present invention, the processor 105 generates the first relation F1 according to a machine learning method. In addition, in another embodiment of the present invention, the processor 105 can generate and save a first look-up table according to the depth information DA, DB and the reference distances RDA, RDB, and generate the first relation F1 according to the first look-up table. Therefore, when the processor 105 utilizes the left-eye image LI and the right-eye image RI to generate depth information DX corresponding to a point X, the processor 105 can calibrate the depth information DX according to the first relation F1.

Figure 3:
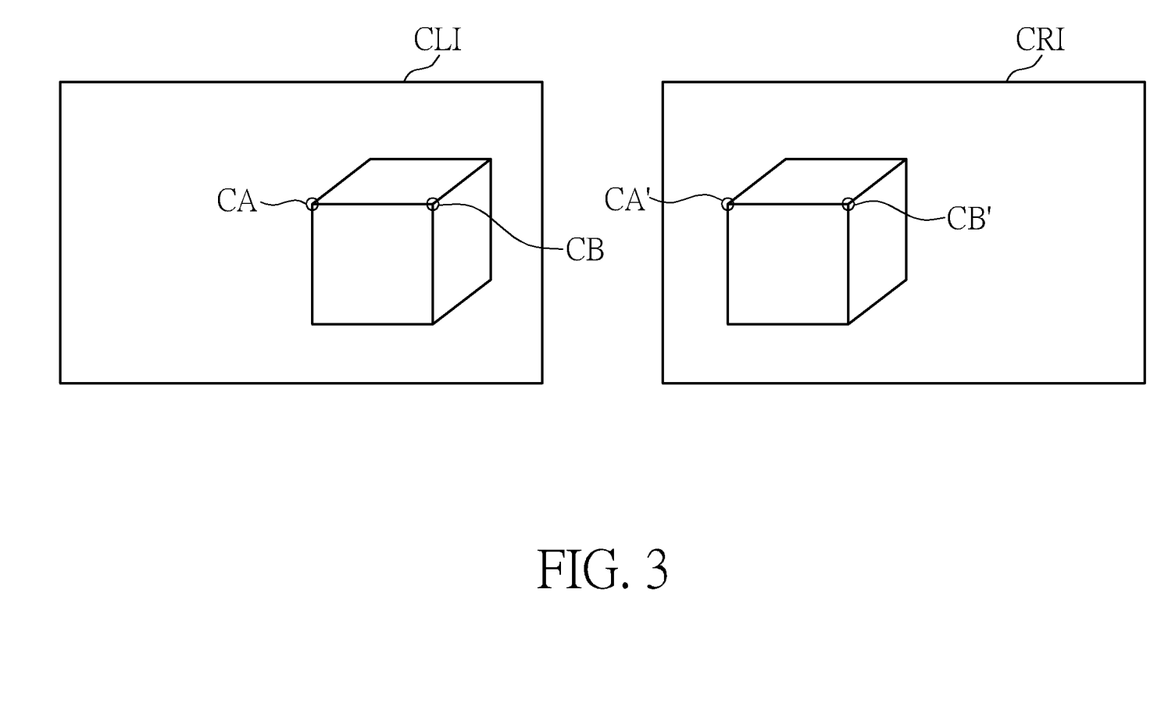
FIG. 3 is a diagram illustrating the calibrated left-eye image and the calibrated right-eye image.

In addition, in another embodiment of the present invention, when the processor 105 determines that the depth information DA, DB, or the left-eye image LI and the right-eye image RI need to be calibrated, the processor 105 can generate a reference coordinate (xa, ya, za) corresponding to the feature point A according to the reference distance RDA and a direction or an angle of a first laser beam emitted by the laser rangefinder 103, wherein the first laser beam corresponds to the feature point A. Similarly, the processor 105 can generate a reference coordinate (xb, yb, zb) corresponding to the feature point B according to the reference distance RDB and a direction or an angle of a second laser beam emitted by the laser rangefinder 103, wherein the second laser beam corresponds to the feature point B. After generating the reference coordinates (xa, ya, za), (xb, yb, zb), the processor 105 can calibrate the left-eye image LI to generate a calibrated left-eye image CLI and calibrate the right-eye image RI to generate a calibrated right-eye image CRI according to the reference coordinates (xa, ya, za), (xb, yb, zb). Please refer to FIG. 3. FIG. 3 is a diagram illustrating the calibrated left-eye image CLI and the calibrated right-eye image CRI. As shown in FIG. 3, because the calibrated left-eye image CLI includes a calibrated feature point CA corresponding to the feature point A and a calibrated feature point CB corresponding to the feature point B, and the calibrated right-eye image CRI includes a calibrated feature point CA' corresponding to the feature point A' and a calibrated feature point CB' corresponding to the feature point B', the processor 105 can generate calibrated depth information CDA corresponding to the depth information DA according to the calibrated feature point CA and the calibrated feature point CA', and generate calibrated depth information CDB corresponding to the depth information DB according to the calibrated feature point CB and the calibrated feature point CB'.

Figure 4:
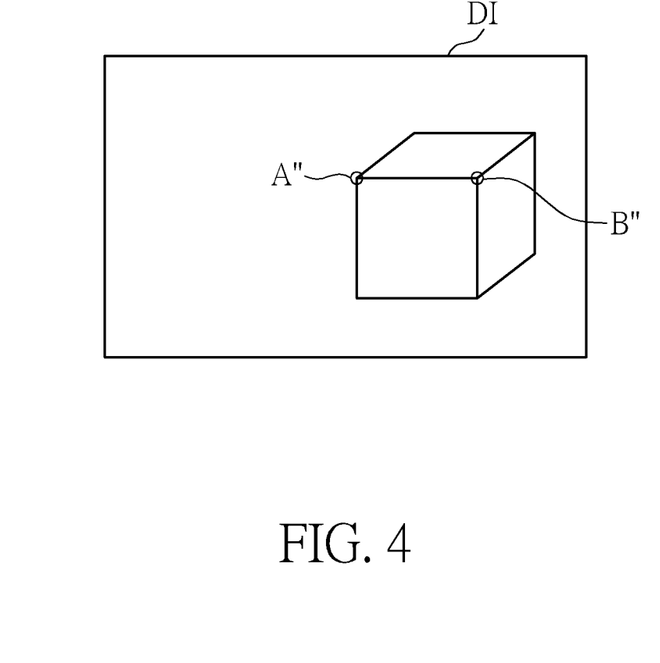
FIG. 4 is a diagram illustrating the depth map.

In addition, in another embodiment of the present invention, when the processor 105 determines that the depth information DA, DB, or the left-eye image LI and the right-eye image RI need to be calibrated, the processor 105 executes a scan line calibration on the left-eye image LI and the right-eye image RI first, wherein the scan line calibration is used for aligning scan lines of the left-eye image LI and scan lines of the right-eye image RI to generate an aligned left-eye image and an aligned right-eye image, scan lines of the aligned left-eye image and scan lines of the aligned right-eye image are parallel to the baseline between the image capturers 1011, 1013, and the scan lines of the aligned left-eye image and the scan lines of the aligned right-eye image are parallel each other. Therefore, the processor 105 can generate a depth map DI (as shown in FIG. 4) according to the aligned left-eye image and the aligned right-eye image, wherein the depth map DI includes points A", B", the point A" corresponds to the feature point A, and the point B" corresponds to the feature point B. In addition, the processor 105 can generate depth information DA", DB" corresponding to the points A", B" according to the depth map DI. In addition, because a shift may exists between the aligned left-eye image and the aligned right-eye image, the processor 105 can calculate a second relation F2 according to the depth information DA", DB", the reference distances RDA, RDB, equation (2), and the regression analysis method:

$$RDX = F2(DX") \tag{2}$$

As shown in equation (2), the reference distances RDA, RDB are substituted into RDX, and the depth information DA", DB" are substituted into DX" to calculate the second relation F2, wherein the second relation F2 can be linear or non-linear. But, in another embodiment of the present invention, the processor 105 generates the second relation F2 according to the machine learning method. In addition, in another embodiment of the present invention, the processor 105 can generate and save a second look-up table according to the depth information DA", DB" and the reference distances RDA, RDB, and generate the second relation F2 according to the second look-up table. Therefore, when the processor 105 utilizes the depth map DI to generate depth information DX" corresponding to the point X, the processor 105 can calibrate the depth information DX" according to the second relation F2.

In addition, in another embodiment of the present invention, the processor 105 can first generate the calibrated left-eye image CLI and the calibrated right-eye image CRI according to the reference coordinates (xa, ya, za), (xb, yb, zb), and generate the depth map DI according to the calibrated left-eye image CLI and the calibrated right-eye image CRI, wherein the depth map DI can be used for generating the depth information DA" corresponding to the point A" and the depth information DB" corresponding to the point B". Therefore, the processor 105 can calculate the second relation F2 according to the depth information DA", DB", the reference distances RDA, RDB, equation (2) and the regression analysis method. Therefore, when the processor 105 utilizes the depth map DI to generate the depth information DX" corresponding to the point X, the processor 105 can calibrate the depth information DX" according to the second relation F2.

Figure 5:
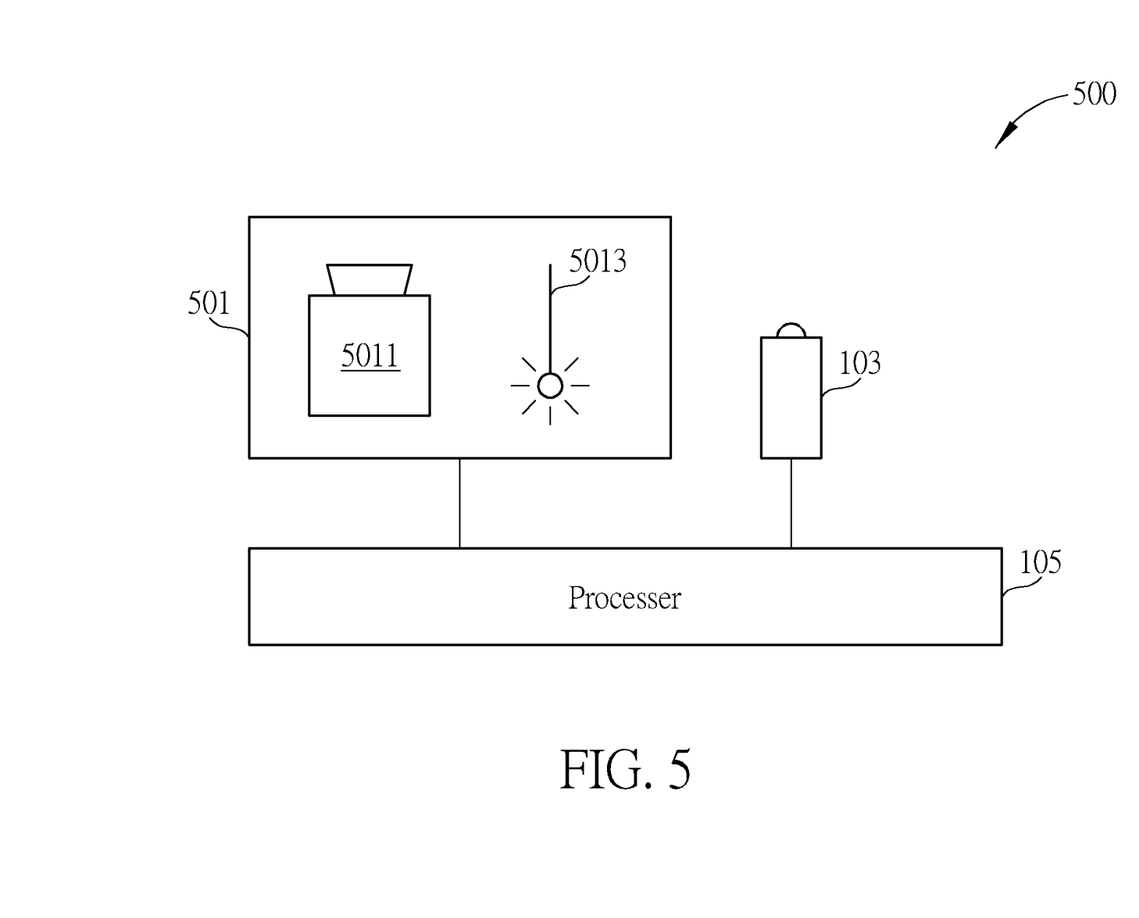
FIG. 5 is a diagram illustrating an image capture system with calibration function according to a second embodiment of the present invention.

Please refer to FIG. 5. FIG. 5 is a diagram illustrating an image capture system 500 with calibration function according to a second embodiment of the present invention. As shown in FIG. 5, a difference between the image capture system 500 and the image capture system 100 is that the image capture system 500 utilizes an image capture device 501 to replace a function of the image capture device 101, wherein the image capture device 501 includes an image capturer 5011 and a light source 5013. The light source 5013 is used for emitting emission light, wherein the emission light can be structured light, and the image capturer 5011 is used for capturing an image including the structured light. In addition, the processer 105 determines at least one feature point according to the image including the structured light, and generates at least one depth information corresponding to the at least one feature point according to the image including the structured light; and the laser rangefinder 103 measures at least one reference distance corresponding to the at least one feature point according to the at least one feature point. And when the at least one depth information needs to be calibrated, the processer 105 calibrates the at least one depth information according to the at least one reference distance. In addition, subsequent operation methods of the processer 105 can be referred to the above-mentioned operation methods of the processer 105, so further description thereof is omitted for simplicity.

In addition, those of ordinary skill in the art should clearly realize functions of the processer 105 through the above-mentioned corresponding descriptions of the processer 105, so those of ordinary skill in the art can easily implement the processer 105 through a field programmable gate array (FPGA) with the above-mentioned functions of the processer 105, or an application-specific integrated circuit (ASIC) with the above-mentioned functions of the processer 105, or a software module with the above-mentioned functions of the processer 105, or an analog integrated circuit with the above-mentioned functions of the processer 105. Therefore, further description of corresponding structures of the processer 105 is omitted for simplicity.

Figure 6:
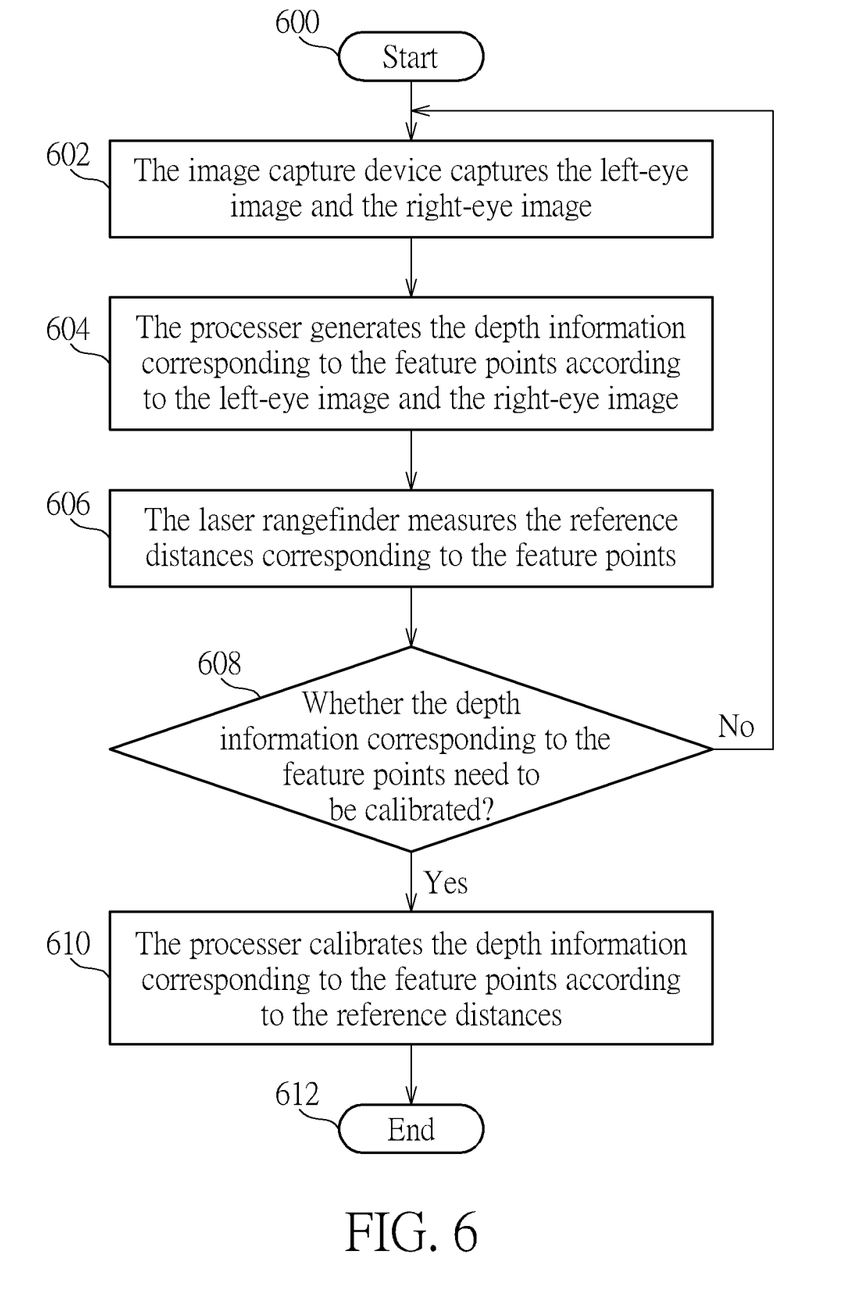
FIG. 6 is a flowchart illustrating an operation method of the image capture system with calibration function according to a third embodiment of the present invention.

Please refer to FIG. 6. FIG. 6 is a flowchart illustrating an operation method of the image capture system 100 with calibration function according to a third embodiment of the present invention. The operation method in FIG. 6 is illustrated using the image capture system 100 in FIG. 1. Detailed steps are as follows:

Step 600: Start.

Step 602: The image capture device 101 captures the left-eye image LI and the right-eye image RI.

Step 604: The processer 105 generates the depth information DA corresponding to the feature point A and the depth information DB corresponding to the feature point B according to the left-eye image LI and the right-eye image RI.

Step 606: The laser rangefinder 103 measures the reference distance RDA corresponding to the feature point A and the reference distance RDB corresponding to the feature point B.

Step 608: Whether the depth information DA, DB corresponding to the feature points A, B need to be calibrated; if no, go back to step 602; if yes, go to step 610.

Step 610: The processer 105 calibrates the depth information DA, DB corresponding to the feature points A, B according to the reference distances RDA, RDB.

Step 612: End.

In step 604, the processer 105 determines the feature points A, B of the left-eye image LI and the feature points A', B' of the right-eye image RI according to the left-eye image LI and the right-eye image RI, generates the depth information DA corresponding to the feature point A according to the feature points A, A', and generates the depth information DB corresponding to the feature point B according to the feature points B, B'. In step 606, the laser rangefinder 103 measures the reference distance RDA corresponding to the feature point A and the reference distance RDB corresponding to the feature point B according to the feature points A, B, respectively. In addition, in another embodiment of the present invention, the laser rangefinder 103 emits the laser beams first. Then, the processer 105 determines corresponding feature points according to the positions of the laser beams in the left-eye image LI and the right-eye image RI. Therefore, in this embodiment, the image capture system 100 can operate in a sequence of step 602, step 606, step 604, and step 608.

In step 608, the processer 105 determines whether the depth information DA, DB need to be calibrated according to the depth information DA, DB and the reference distances RDA, RDB. But, in another embodiment of the present invention, the processer 105 determines whether the depth information DA, DB need to be calibrated according to the left-eye image LI and the right-eye image RI or according to the depth map generated from the left-eye image LI and the right-eye image RI. Meanwhile, the processer 105 does not determine whether the depth information DA, DB need to be calibrated according to the reference distances RDA, RDB. Therefore, in this embodiment, the image capture system 100 can operate in a sequence of step 604 and step 608, and when the depth information DA, DB need to be calibrated, the image capture system 100 continues operating in a sequence of step 606 and step 610.

In addition, in step 610, an operation method of processer 105 calibrating the depth information DA, DB according to the reference distances RDA, RDB can be referred to the above-mentioned operation method related to the processer 105, so further description thereof is omitted for simplicity.

To sum up, the present invention provides an image capture system with calibration function. The image capture system utilizes an image capture device to capture at least one image, generates a plurality of depth information according to the at least one image, and utilizes a laser rangefinder to measure a plurality of reference distances corresponding to the plurality of depth information. Because the image capture system utilizes the laser rangefinder to generate the plurality of reference distances, the image capture system can calibrate the plurality of depth information according to the plurality of reference distances. Therefore, compared to the prior art, the present invention can execute a calibration more rapidly and conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capture system with calibration function, comprising:
    an image capture device;
    a laser rangefinder emitting laser beam, wherein the image capture device is used for capturing two images corresponding to the laser beam; and
    a processor coupled to the image capture device and the laser rangefinder for determining at least one feature point according to positions of the laser beam in the two images, and generating depth information corresponding to each feature point of the at least one feature point according to the two images;

wherein the laser rangefinder measures a reference distance corresponding to the each feature point, and when the processor determines to calibrate the depth information or the two images, the processor executes scan line calibration according to the at least one feature point to generate two aligned images, generates aligned depth information corresponding to the each feature point according to the two aligned images, and calibrates the aligned depth information or the two aligned images according to the reference distance when a resolution of a depth map or a number of valid pixels of the depth map is less than a predetermined value, wherein the two images are used for generating the depth map.

2. The image capture system of claim 1, wherein when the processor determines that the depth information or the two images need to be calibrated according to the reference distance, the processor calibrates the aligned depth information or the two aligned images according to the reference distance.

3. The image capture system of claim 2, wherein when the two images need to be calibrated, the processor generates a reference coordinate corresponding to the each feature point according to the reference distance, calibrates the two aligned images according to at least one reference coordinate of the at least one feature point.

4. The image capture system of claim 2, wherein when the depth information needs to be calibrated, the processor generates the aligned depth information corresponding to the reference distance according to the two aligned images, generates a relation according to the aligned depth information and the reference distance, and calibrates the aligned depth information according to the relation, wherein the scan line calibration is used for aligning scan lines of the two images.

5. The image capture system of claim 1, wherein the processor adjusts a direction or an angle of the laser rangefinder to make the laser rangefinder emit at least one laser beam to the at least one feature point and measure the reference distance.

6. The image capture system of claim 1, wherein the processor executes the scan line calibration on the two images according to the at least one feature point to generate the two aligned images.

7. The image capture system of claim 1, wherein when an image misalignment exists between the two images, the processor calibrates the aligned depth information or the two aligned images according to the reference distance.

8. The image capture system of claim 1, wherein when a difference between the depth information and the reference distance is greater than a predetermined value, the processor calibrates the aligned depth information or the two aligned images according to the reference distance.

9. An image capture system with calibration function, comprising:
- an image capture device;
- a laser rangefinder emitting laser beam; and
- a processor generating a plurality of depth information according to at least one image captured by the image capture device, wherein the at least one image corresponds to the laser beam, and each depth information of the plurality of depth information correspond to a corresponding position of positions of the laser beam in the at least one image;
- wherein the laser rangefinder measures a plurality of reference distances corresponding to the plurality of depth information, and the processor calibrates the plurality of depth information according to the plurality of reference distances when a resolution of a depth map or a number of valid pixels of the depth map is less than a predetermined value, wherein the depth map corresponds to the at least one image.

10. An image capture system with calibration function, comprising:
- an image capture device;
- a laser light source emitting laser beam; and
- a processor determining feature points according to positions of the laser beam in one image captured by the image capture device, and generating a plurality of depth information corresponding to the feature points;
- wherein the laser light source measures a plurality of reference distances corresponding to the plurality of depth information, and the processor calibrates the plurality of depth information according to the plurality of reference distances when a resolution of a depth map or a number of valid pixels of the depth map is less than a predetermined value, wherein the depth map corresponds to the one image.

* * * * *